May 8, 1956     E. F. KURTH     2,744,920
CONVERTING DIHYDROQUERCETIN TO QUERCETIN
Filed Sept. 9, 1952
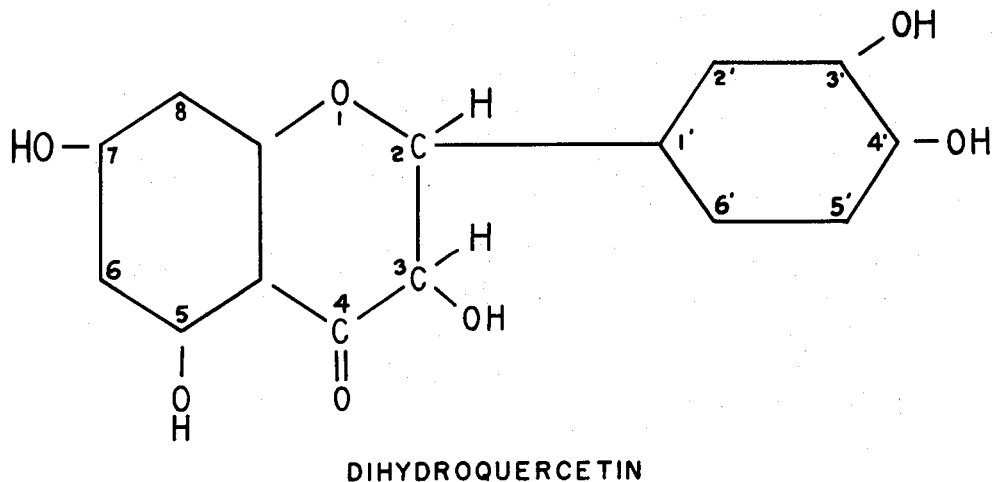
DIHYDROQUERCETIN
HEAT ABOVE ABOUT 40° C. WITH AN AQUEOUS SOLUTION OF AN ALKALI METAL BISULFITE OR AMMONIUM BISULFITE, PREFERABLY SODIUM BISULFITE
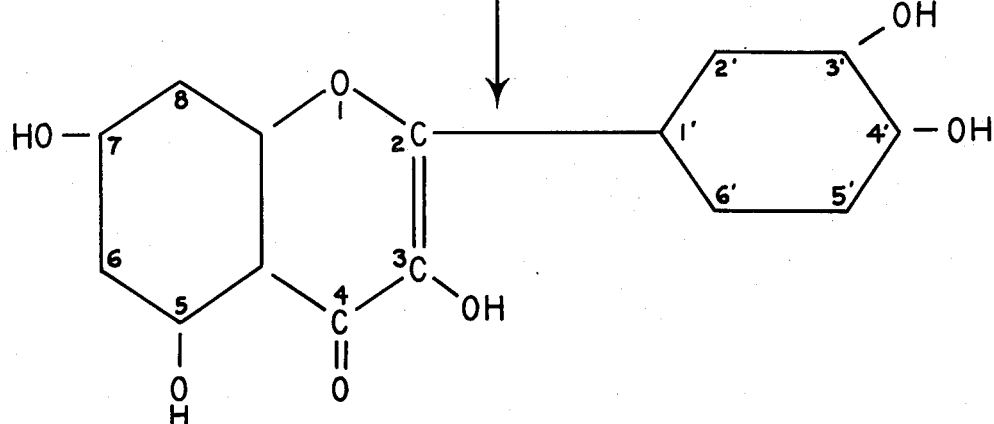
QUERCETIN
*INVENTOR.*
ERVIN F. KURTH
BY *Eugene D. Farley*
ATTY.

United States Patent Office 2,744,920
Patented May 8, 1956

2,744,920

CONVERTING DIHYDROQUERCETIN TO QUERCETIN

Ervin F. Kurth, Corvallis, Oreg., assignor to the State of Oregon, acting by and through the Oregon State Board of Forestry Application September 9, 1952, Serial No. 308,677

8 Claims. (Cl. 260—345.2)

This invention relates to a process of converting dihydroquercetin to quercetin.

As is apparent from the drawing comprising a flow plan of the presently described process, dihydroquercetin and quercetin are closely related compounds, the former being 3, 5, 7, 3', 4' pentahydroxy-4 oxy-2 phenyl chroman and the latter being 3, 5, 7, 3', 4' pentahydroxy-2, 3 dehydro-4 oxy-2 phenyl chroman. Although quercetin at the present time is costly and available in small quantities only, it has great present and potential commercial utility.

It is, for example, an effective antioxidant in fats and oils, and because of its non-toxic nature, is of particular value as an antioxidant for preventing vegetable oils, lard and butter from becoming rancid. In addition, quercetin has pronounced physiological activity and is useful medicinally for the treatment of such conditions as capillary fragility associated with hypertension, hemorrhagic diseases, frost bite, and protection from radiation exposure. In such uses it may be applied in the form of rutin derived from buckwheat and consisting of the glucoside of quercetin wherein one molecule of quercetin is combined with one of glucose and one of rhamnose, the quercetin residue being the physiologically active portion of the compound.

Although as noted above quercetin heretofore has not been available on a large commercial scale, it now has become potentially available in large quantities at relatively low cost with the discovery of dihydroquercetin as a substantial constituent of the barks of certain species of trees such as Douglas fir and Jeffrey pine. Hence it would be desirable to provide a process for the conversion of this now abundant raw material to quercetin, and it is the purpose of this invention to provide such a process.

The present invention is predicated on the surprising discovery that dihydroquercetin, even though in crude impure form, may be converted to pure quercetin rapidly and in high yields by the simple process of reacting it with an aqueous solution of at least one member of the group consisting of the alkali metal bisulfites and ammonium bisulfite. When this is done, there separates promptly from the aqueous reaction mixture a high yield, i. e. a yield of the order of about 85% by weight, of chemically pure quercetin in the form of yellow crystals. This result is unique and unexpected since in accordance with the usual laws governing the course of chemical reactions it would not be expected that sodium bisulfite, a reducing agent, would convert dihydroquercetin to quercetin, an oxidized derivative, by the removal of two hydrogen atoms from each molecule of dihydroquercetin.

Considering the foregoing process in greater detail:

Although the dihydroquercetin starting material may be employed in pure crystalline form, it also may be employed in the form of the crude product mixed with tannin and other materials extracted together with the dihydroquercetin during the extraction procedure by which the latter may be obtained from bark. This is an important feature of the present process since the extractive constituents of bark are extremely complex in character and it normally is difficult to separate a given constituent in pure form and high yield.

The dihydroquercetin, whether in pure or crude form, is treated in a reaction vessel of suitable design with an aqueous solution of at least one member of the group consisting of the alkali metal bisulfites, and ammonium bisulfite. Hence there may be employed singly or in admixture with each other ammonium bisulfite, sodium bisulfite, potassium bisulfite or the bisulfites of lithium, rubidium, and caesium, although the last three because of their scarcity are obviously of limited commercial significance in connection with the present process. Of the foregoing, sodium bisulfite is a preferred reagent because of its availability and effective action.

It will be apparent that in lieu of the aforementioned bisulfites which are suitable for effectuating the process of this invention, there may also be employed compounds and reagents which in the reaction medium involved will react with each other to form these bisulfites. Thus there may be employed aqueous solutions of ammonium hydroxide or of the alkali metal hydroxides, together with sulphur dioxide, these materials reacting with each other in accordance with well known chemical reactions to produce the corresponding bisulfites. Also, there may be employed the sulfites of ammonium and the alkali metals together with a predetermined amount of an acid which will react with the sulfites to form the corresponding bisulfites.

It will be further evident that although the presently described process may be most conveniently and effectively carried out in an aqueous medium, that liquids and solvents other than water may be introduced into the reaction mixture as desirable or necessary for procuring the conversion of the dihydroquercetin to the quercetin and the complete separation of the latter in pure form from the other constituents of the mixture.

Although the mechanism by which the conversion process occurs is not known to me, it appears that the bisulfite acts in a catalytic capacity since it is effective in a relatively minor proportion and since, after the conversion of a first quantity of dihydroquercetin to quercetin, the residual liquor may be used and reused in the conversion of further quantities of dihydroquercetin with substantially unreduced effectiveness.

Thus the lower limit of bisulfite compound usage is that required to catalyze the conversion of the dihydroquercetin to quercetin. The upper limit is determined by the solubility of the bisulfite compound in the reaction medium and the reaction temperature employed. Where water is used as the reaction medium and sodium bisulfite as the bisulfite compound, and in general in the case of the other bisulfite compounds as well, from about 1 part to about 20 parts by weight of bisulfite compound for each part by weight of dihydroquercetin represents a preferred ratio of these reactants.

The amount of solvent to employ in carrying out the presently described process obviously will be determined by such factors as the particular bisulfite compound used, the purity of the dihydroquercetin, the character of any impurities which may be present in the dihydroquercetin, the reaction temperature and the like. However, a sufficient amount of solvent should be employed to maintain the bisulfite compound and the dihydroquercetin in solution. The upper limit of solvent usage is that amount which will so dilute the reaction mixture as to make it impractical, or which will dissolve a substantial amount of the quercetin product, thereby making the separation of the latter difficult or impossible. It is preferred to carry out the conversion using sufficient solvent to produce a 1 to 25% solution of the bisulfite compound.

The reaction temperature to be employed also is variable depending upon the identity and proportions of the reacting materials. In general, however, a reaction temperature of at least about 40° C. should be employed to accelerate the reaction until it is completed within a reasonable period. The upper limit of reaction temperature is the boiling point of the reaction mixture which normally will be about 100° C. at atmospheric pressure. A preferred reaction temperature range in the usual case is between about 70° C. and the boiling point of the solution.

The reaction between the dihydroquercetin and the bisulfite compound preferably is carried out at atmospheric pressure in an open vessel. If desired, however, as in order to accelerate the reaction rate, it may be carried out at super atmospheric pressures in a pressure vessel. In this case, it may be further desirable to carry it out in an atmosphere of sulfur dioxide.

The duration of the reaction will be determined by such factors as the identity of the reactants, the concentration of the reaction mixture, and the particular reaction temperature and pressure employed. In general, however, the reaction should be carried on until a substantial proportion of the dihydroquercetin has been converted to quercetin and has separated in pure crystalline form from the hot reaction medium. In the usual case, this requires between about ½ hour and about 15 hours. The mixture may be filtered hot to remove the quercetin product, which then may be washed with water or recrystallized for removal of any occluded bisulfite compound or of other impurities.

The process of the present invention is further illustrated by the accompanying examples, wherein parts are expressed as parts by weight.

Example I

This example illustrates the application of sodium bisulfite in the conversion of dihydroquercetin to quercetin.

Five parts of crystalline dihydroquercetin and five parts of sodium bisulfite were dissolved in 100 parts water. The resulting solution was refluxed at atmospheric pressure for 1½ hours, at the end of which time a yield of 32% quercetin was separated by filtration from the hot solution. The residual liquor then was refluxed for an additional 16 hours after which an additional 25% yield of quercetin was separated. The total yield therefore was 57% of a yellow, crystalline product melting at 316–318° C. with sublimation.

The foregoing procedure was repeated, using however, 5 parts dihydroquercetin, 10 parts sodium bisulfite and 100 parts water. The yield at the end of 1½ hours was 59%. After an additional 16 hours of refluxing an additional yield of 7% of quercetin was obtained, the total yield in this case being 66%.

The foregoing procedure again was repeated, this time using 5 parts dihydroquercetin, 20 parts sodium bisulfite and 100 parts water. The yield obtained after a reflux period of ¾ hour was 85%.

Example II

This example illustrates the application of ammonium bisulfite in the conversion of dihydroquercetin to quercetin.

A solution of 5 parts dihydroquercetin, 10 parts ammonium bisulfite, and 100 parts water was refluxed at atmospheric pressure for 1½ hours. A yield of 32% quercetin was separated by filtration from the hot reaction medium at the end of this time. Thereafter the residual mixture was refluxed for an additional period of 16 hours, after which an additional yield of 46% quercetin was obtained. Thus there was obtained a total yield of 78% quercetin as a yellow crystalline compound melting at 316–318° C.

The foregoing procedure was repeated, using however, 5 parts dihydroquercetin, 15 parts ammonium bisulfite and 100 parts water. In this case a yield of 56% quercetin was obtained after 1¼ hours and a further yield of 29% after an additional reflux period of 16 hours, the total yield being 85%.

In a manner similar to that illustrated in Examples I and II, dihydroquercetin is converted to quercetin using potassium bisulfite in place of the sodium and ammonium bisulfite of those examples.

Example III

This example illustrates the application of a regenerated bisulfite reaction liquor to the presently described process.

Sulfur dioxide was bubbled at atmospheric pressure for 10 minutes through the reaction liquor remaining after removal of the quercetin from the second reaction liquor of Example II. 5 parts of dihydroquercetin then was added and the mixture refluxed at atmospheric pressure for 1½ hours. At the end of this time a yield of 50% quercetin was obtained. The mixture then was refluxed for an additional 2 hours, at which time an additional yield of 29% quercetin was obtained, bringing the total yield to 79%.

Example IV

This example illustrates the catalytic character of the bisulfite reagent.

4 successive runs were made using the same bisulfite liquor as follows: First 5 parts dihydroquercetin, 20 parts sodium bisulfite, and 100 parts water were refluxed at atmospheric pressure for 15 minutes, the quercetin product separated, and the residual liquor refluxed for an additional 25 minutes. The yield at the end of these periods was 50% and 35% respectively, making a total yield of 85%.

Next to the liquor remaining from the above procedure 5 parts additional dihydroquercetin was added. The resulting mixture then was refluxed first for 25 minutes at atmospheric pressure and thereafter for an additional 75 minutes, the quercetin being filtered off at the end of each reaction period. The yields obtained were 58% and 39% respectively, making a total yield of 97%.

Next to the liquor remaining from the above an additional 5 parts dihydroquercetin was added. The mixture then was refluxed for a first period of 35 minutes and a second period of 105 minutes. The quercetin was removed at the end of each of the reaction periods. The first yield was 52% and the second 25% making a total of 77%.

Next, to the liquor remaining from the above three reactions there was added still a further quantity of 5 parts dihydroquercetin. After refluxing for reaction periods of 35 and 100 minutes there were obtained 32% and 41% yield of quercetin respectively, the total yield thus being 73%.

When the residual liquor was acidified with hydrochloric acid, some unreacted dihydroquercetin was obtained.

Example V

This example illustrates the application of the presently described process to the conversion of impure dihydroquercetin to quercetin.

The starting material in this case was dihydroquercetin mixed with a substantial proportion of tannin and other complex materials found in the bark of trees together with dihydroquercetin. 10 parts of this crude dihydroquercetin was dissolved in 100 parts water, together with 10 parts sodium bisulfite. The resulting mixture was refluxed at atmospheric temperature for a total period of 50 minutes, after which the pure quercetin product was separated from the reaction mixture by filtration.

Example VI

This example illustrates the inapplicability of other reagents to the conversion of dihydroquercetin to quercetin and hence the unique character of the presently described process.

In each instance 5 parts of dihydroquercetin were refluxed with a 5% solution of the reagent for the indicated time period. In all cases no quercetin whatsoever was obtained. The results are given below.

| Reagent employed | Reaction Time (Hours) | Yield of Quercetin Obtained |
|---|---|---|
| Oxalic Acid | 1¾ | 0 |
| Monobasic Sodium phosphate | 1½ | 0 |
| Sodium bisulfate | 1 | 0 |
| Sodium carbonate | ½ | 0 |
| Sodium bicarbonate | ⅓ | 0 |
| Sodium acetate | ⅓ | 0 |
| Sulfurous Acid (Reflux) | 8 | 0 |
| Sulfurous acid (Sealed tube) | 8 | 0 |

Thus it will be apparent that by the present invention I have provided a unique and effective procedure for converting a now abundant raw material, dihydroquercetin, to a potentially valuable final product, quercetin. The latter is obtained in pure crystalline form in which it is well suited for application in many uses per se as well as in the production of derivative products by synthetic organic processes. The reaction is applicable, moreover, to crude dihydroquercetin as obtained from natural sources, the reaction even in this case yielding a pure quercetin product. Still further, the reaction is readily carried out in a comparatively short reaction time in simple equipment using inexpensive and readily available agents.

Having thus described my invention in preferred embodiments, I claim as new and desire to protect by Letters Patent:

1. The process of converting dihydroquercetin to quercetin which comprises reacting an aqueous solution of dihydroquercetin with at least one member of the group consisting of the alkali metal bisulfites and ammonium bisulfite, the said solution having a bisulfite concentration of from about 1% by weight to that required to saturate the solution, the reaction temperature being between about 40° C. and the boiling point of the solution, and the reaction time being sufficient to convert a substantial proportion of the dihydroquercetin to quercetin.

2. The process of claim 1 wherein the bisulfite compound comprises sodium bisulfite.

3. The process of claim 1 wherein the bisulfite compound comprises potassium bisulfite.

4. The process of claim 1 wherein the bisulfite compound comprises ammonium bisulfite.

5. The process of converting dihydroquercetin to quercetin which comprises reacting 1 part dihydroquercetin with from about 1 part by weight to about 20 parts by weight of at least one member of the group consisting of the alkali metal bisulfites and ammonium bisulfite in an aqueous solution containing between about 1 and about 25 parts by weight of the bisulfite at a reaction temperature of between about 70° C. and the boiling temperature of the solution, for a time sufficient to convert a substantial proportion of the dihydroquercetin to quercetin and to effect its separation in crystalline form from the reaction mixture.

6. The process of claim 5 wherein the bisulfite compound comprises sodium bisulfite.

7. The process of claim 5 wherein the bisulfite compound comprises potassium bisulfite.

8. The process of claim 5 wherein the bisulfite compound comprises ammonium bisulfite.

References Cited in the file of this patent

David et al.: Compt. Rendu 235, pp. 1325–7 (1952).
Lepetit et al.: Atti Accad. Lincei, 25, I, pp. 322–325 (1916).
Dumesny et al.: Wood Products Distillates and Extracts, 2d revised ed., 1921, Scott, Greenwood and Son, London, pp. 276–81.
Lepetit et al.: Chem. Abst., vol. 11, pp. 791–2 (1917).
Kurth et al.: Chem. Abst., vol. 42, col. 7977 (1948).
Kurth et al.: Chem. Abst., vol. 44, col. 8681 (1950).
Kurth et al.: Chem. Abst., vol. 45, col. 10618 (1951).
Hubbard et al.: Chem. Abst., vol. 43, col. 9172 (1949).